United States Patent
Allen et al.

(10) Patent No.: US 6,345,465 B1
(45) Date of Patent: Feb. 12, 2002

(54) LANDSCAPE EDGING SYSTEM WITH STAKES ATTACHED

(76) Inventors: Glen Allen, 1709 Brazoria, Mesquite, TX (US) 75150; Steve Glassel, 822 Magnolia Dr., Garland, TX (US) 75040

(*) Notice: Subject to any disclaimer, the term of this patent is extended or adjusted under 35 U.S.C. 154(b) by 0 days.

(21) Appl. No.: 09/575,203

(22) Filed: May 18, 2000

(51) Int. Cl.[7] ................................................. A01G 1/08
(52) U.S. Cl. .......................................................... 47/33
(58) Field of Search ............................ 47/33; 285/3, 4; 404/6, 7; 52/102

(56) References Cited

U.S. PATENT DOCUMENTS

| | | | | |
|---|---|---|---|---|
| 397,732 | A | * 2/1889 | Landis | ............ 47/33 |
| 696,792 | A | * 4/1902 | Bedell | |
| 2,662,342 | A | * 12/1953 | Peterson | .......... 404/6 |
| 4,046,356 | A | * 9/1977 | Rose | |
| 4,628,632 | A | 12/1986 | Zwier | |
| 4,647,491 | A | 3/1987 | Ireland | |
| 4,702,034 | A | * 10/1987 | Ferguson et al. | ............ 47/33 |
| 5,020,272 | A | 6/1991 | Herrema | |
| 5,301,461 | A | 4/1994 | Zwier | |
| 5,375,369 | A | 12/1994 | VerHoeve | |
| 5,941,018 | A | * 8/1999 | Herrema | .......... 47/33 |

FOREIGN PATENT DOCUMENTS

| | | | |
|---|---|---|---|
| EP | 0671527 A1 | * | 9/1995 |
| FR | 2568615 A2 | * | 8/1984 |

* cited by examiner

*Primary Examiner*—Michael J. Carone
*Assistant Examiner*—Jeffrey L. Gellner
(74) *Attorney, Agent, or Firm*—John G. Fischer

(57) ABSTRACT

A landscape-edging device is disclosed which may be used to segregate dissimilar landscaping schemes by positioning the device into the soil. The landscape edging is made of flexible strips, designed for continuous end-to-end attachment. The edging is attached to the soil by stakes. The edging system is designed so that stakes are removably attached to the edging portion of the device. By this attachment, the stakes can be conveniently and cost effectively manufactured and shipped together with the edging portion. Stiffening ribs on the stakes increase the strength of the stakes so that they may be made from the same material and thickness as the edging portion.

29 Claims, 8 Drawing Sheets

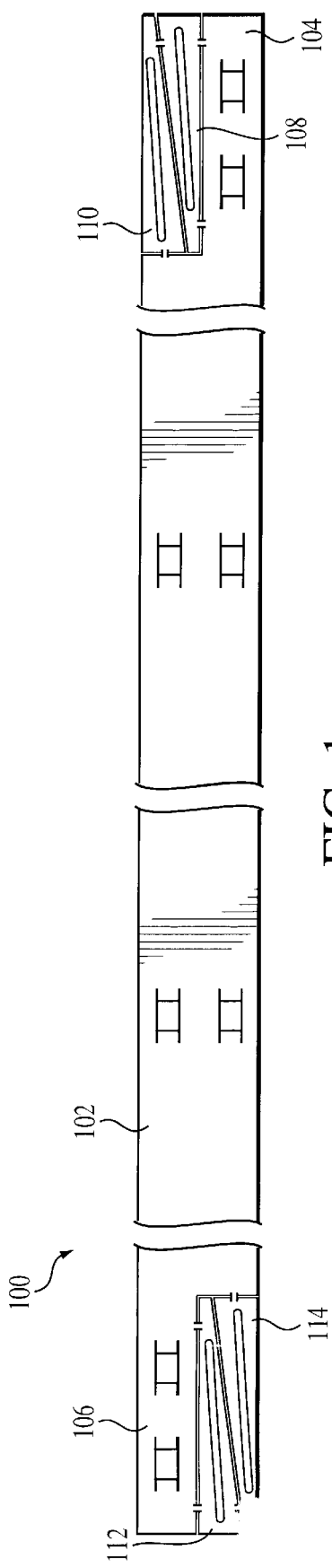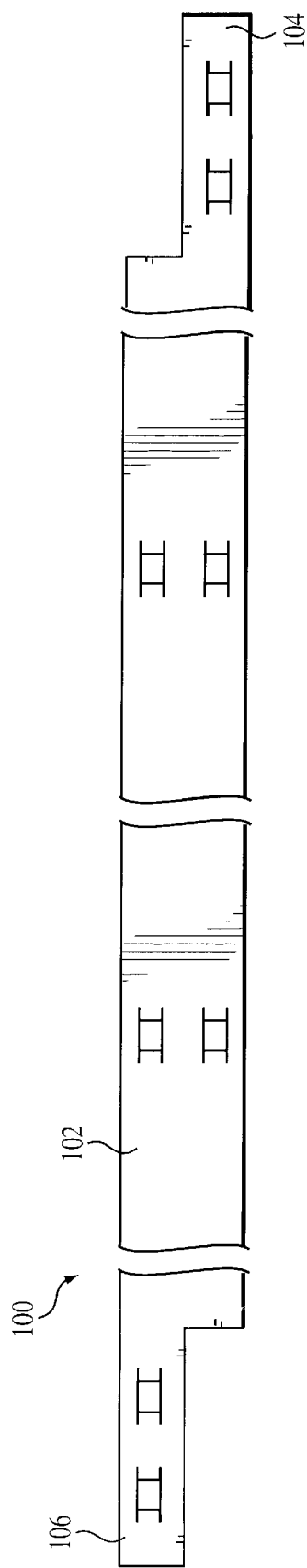

LANDSCAPE EDGING SYSTEM WITH STAKES ATTACHED

CROSS-REFERENCE TO RELATED APPLICATION

None

BACKGROUND OF THE INVENTION

1. Technical Field

The present invention relates to the field of landscape barriers, and particularly to the design of flexible landscape edging, and more particularly to the design of flexible landscape edging utilizing tapered stakes for attachment to the soil in which the tapered stakes are removably attached to the flexible strip portion of the edging.

2. Description of the Related Art

This invention relates to the problem of segregating an area of a garden or landscape scheme from a dissimilar neighboring landscape. In particular, the invention also relates to the problems that arise when flexible edging materials are used which require stakes for attachment of the edging to the soil. More particularly, this invention addresses the problem of manufacturing and delivering to the customer flexible landscape edging that requires stakes for attachment to the soil. There are numerous domestic and commercial applications in which it is desirable to separate dissimilar forms of vegetation, or landscape schemes. Of the various applications, there are numerous reasons for the need to separate landscape schemes, including aesthetics, incompatibility with neighboring vegetation, and differences in climatic requirements.

There are a number of well-known landscape barrier systems currently available, including wooden logs, flexible metal strips, flexible plastic strips, clay forms, stone, and brick. All of these systems are known to satisfactorily segregate the landscape schemes with certain differences noted in their overall performances.

Of all of the landscape barrier systems commercially available, flexible strips made of materials such as metal and plastic are among the most popular due to their flexible design options, ease of installation, and low cost. These systems allow for end-to-end series attachment of like sections of the system. This permits the construction of a continuous and uninterrupted landscape barrier of any length desired. The systems can be used to block the growth of roots between vegetation and incompatible neighboring vegetation, or between vegetation and a non-living landscape scheme. For this application, it is advisable to place the edging system low into the soil to block the growth of roots across the edging line. The systems can also be used to decoratively segregate dissimilar landscape schemes where root blocking is not the objective. In these instances, it is not necessary to place the edging as deeply into the soil. In either case, it is advantageous to attach the edging system to the soil with tapered stakes. The tapered stakes are positioned intermittently along the length of the flexible strip, and at its end to lock a first length of flexible strip to a second length of flexible strip. To keep the stakes from bending, they are made of a metal gage that is thicker than that of the edging portion.

A primary disadvantage of the existing systems is the difficulty of manufacturing the flexible strips separately from the tapered stakes. It requires substantial time, effort, and expense to punch the tapered stakes separately, wasting raw materials and tooling, and resulting in the generation of unnecessary material waste. An additional disadvantage of the existing systems is the difficulty of painting the flexible strips separately from the tapered stakes. It requires substantial time, effort, and expense to paint the tapered stakes separately, wasting paint and resulting in the generation of unnecessary material waste associated with the painting process. An additional disadvantage of the existing systems is the difficulty of packaging the flexible strips separately from the tapered stakes. This again requires substantial time, effort, and expense to package the tapered stakes separately, and results in the generation of unnecessary material waste. An additional disadvantage is that since the tapered stakes are shipped as a required accessory at no extra charge, they are not bar coded or entered into store inventories. For the store selling the stakes, this results in a serious tracking problem. An additional disadvantage of the existing systems is encountered by the landscaper who desires to install the system and must pick up the tapered stakes separately. This requires that the landscaper and/or the retail representative calculate the number of stakes required. Often the customer will leave the store with the incorrect number of stakes to complete the installation. As a result, customers often will have to return to the store to get more stakes, or they will take too many, leaving the store with insufficient inventory for the remaining stock of flexible strip portions. An additional disadvantage of the existing systems is that manufacturers are required to over-ship an excess quantity of stakes to correct for improper distributions of the inventory, incurring all of the related cost to manufacture, paint, package, and ship these units. An additional disadvantage of the existing systems is that the shipper, retailer, and purchaser have multiple items of multiple sizes to carry, handle, and store. An additional disadvantage of the existing systems is that the thicker stakes require inventory of a separate material thickness, and are heavier, and therefore more costly to ship. An additional disadvantage of the existing systems is that the stake pocket openings must be slightly larger than the thicker stakes, within a relatively small tolerance range so that the stakes will fit into the pockets without being too loose.

The past attempts to solve this problem have been to charge extra money for the stakes. This helps the manufacturer cover his costs, resulting in a higher cost to the consumer, but does not alleviate any of the issues of resource waste detailed in the paragraph above.

BRIEF SUMMARY OF THE INVENTION

A primary advantage of the present invention is that it eliminates the need to manufacture the flexible strip portions of the system separately from the tapered stakes, thus saving substantial time, effort, raw materials, waste generation and related expenses. An additional advantage of the present invention is that it eliminates the need to paint the flexible strips separately from painting the tapered stakes, thus saving substantial time, effort, raw materials, waste generation and related expenses associated with a separate painting process. An additional advantage of the present invention is that it eliminates the need to package and ship the flexible strips separately from the tapered stakes, thus saving substantial time, effort, raw materials, waste generation and related expenses associated with separate packaging and shipping processes. An additional advantage of the present invention is that the tapered stakes are shipped attached to the flexible strip portion, thus eliminating a need to separately inventory and account for the number of stakes at the retail store. An additional advantage of the present invention is that the landscaper who desires to install the system does not have to be concerned about picking up the right quantity of tapered stakes. An additional advantage of the present invention is that manufacturers are not required to over-ship any quantity of stakes to correct improper distributions of the inventory, thus reducing all of the costs associated with manufacturing, painting, packaging, and shipping the surplus inventory of stakes. An additional advantage of the present invention is that the shipper, retailer, and purchaser have fewer items of a single size to carry, handle, and store, which saves space on trucks and store displays. An additional advantage of the present invention is that the stakes can be made of a thinner material, and of the same material as the edging portion. This eliminates the need for a separate raw material inventory of a separate material thickness, and saves money in shipping costs. An additional advantage of the present invention is that the stake pocket openings can be smaller than the stakes, have a relatively large tolerance range, and allow for an interference fit of the stakes within the stake pockets.

Other advantages of the present invention will become apparent from the following descriptions, taken in connection with the accompanying drawings, wherein, by way of illustration and example, an embodiment of the present invention is disclosed.

In a preferred embodiment of the present invention, a landscape edging system is disclosed having an edging portion, a plurality of stakes removably attached to the edging portion, and a plurality of notch-tab configurations located on the edging portion. Each notch-tab is capable of receiving a stake. In another preferred embodiment, each stake has at least one lengthwise stiffening rib. In another preferred embodiment, removal of the attached stakes leaves a first extension on one end of the edging portion, diagonally opposite and matching to a second extension on the opposite end of the edging portion. This permits construction of a continuous edging structure by end-to-end interlocking connection of edging pieces. In another preferred embodiment, primary tabs removably connect the stakes to the edging portion. In another preferred embodiment, secondary tabs removably connect the stakes to each other.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a front view of a preferred embodiment of the present invention, showing two edging stakes attached to each end of the edging portion by tabs, and intermittent stake pockets attached to the edging portion. In this configuration, the edging system is a single rectangular unit that is easy to manufacture, paint, package, ship, store, inventory, display and handle in retail sales transactions.

FIG. 2 is a front view of a preferred embodiment of the present invention showing the stakes removed from the ends of the edging portion, leaving diagonally opposite end extensions on the edging portion for matching alignment with the end extension of an immediately adjacent section of edging. Stakes are placed in the stake pockets located on each end extension to hold adjacent sections of edging in continuous alignment.

DETAILED DESCRIPTION OF THE INVENTION

Figure 3:
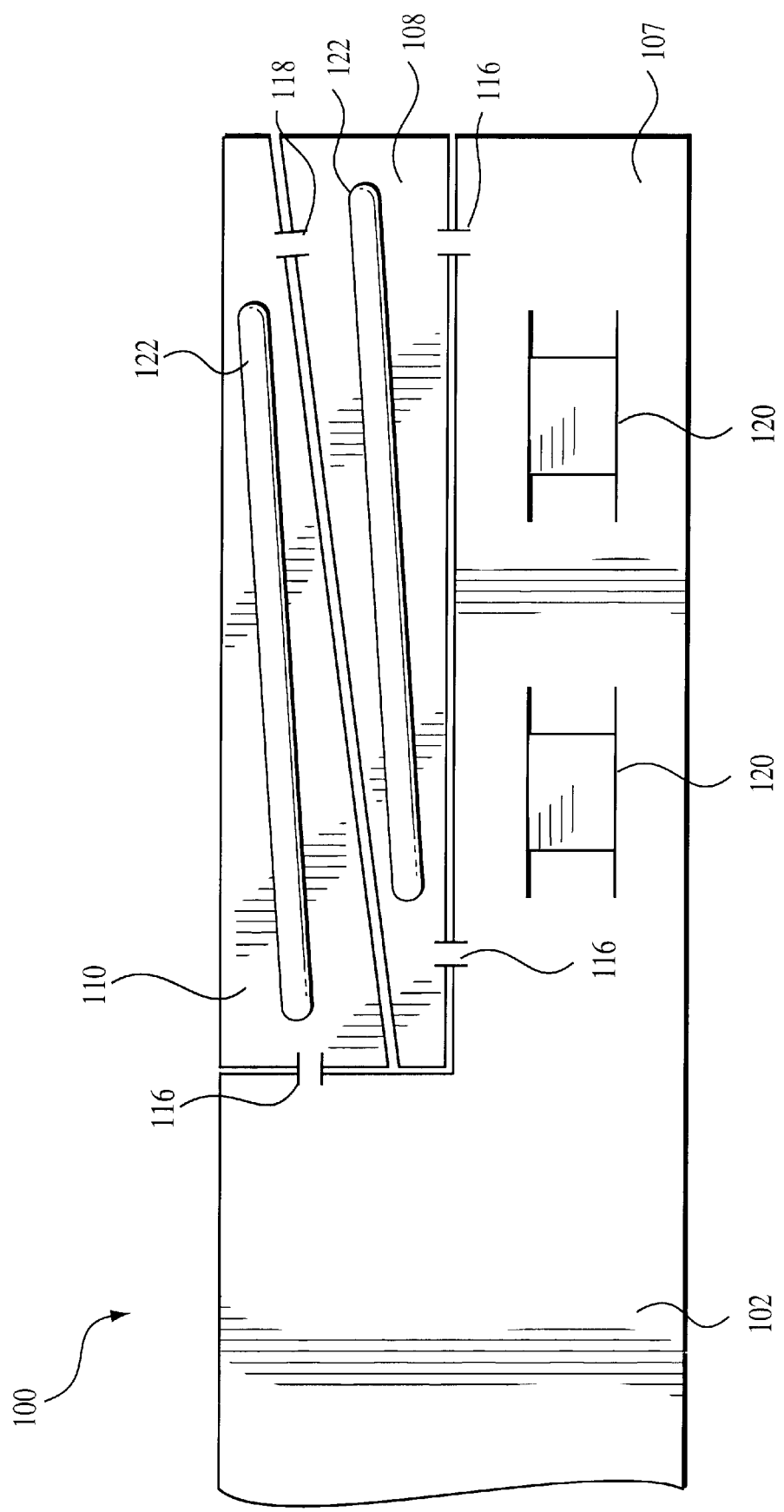
FIG. 3 is a front view close-up of a preferred embodiment of the present invention showing the first end of the edging having the stakes removably attached. In this view, breakable tabs are shown as connecting the oppositely oriented stakes to the edging portion, and to each other, above the leading extension.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

FIG. 1 is a front view of a preferred embodiment of the present invention, showing generally, the edging system 100 in the form that it is provided to the retailer and end user. In this view, a substantially flat and rectangular edging portion 102 is provided, having a leading extension 104 and a diagonally opposite trailing extension 106. A first substantially trapezoidal stake 108 is removably attached to edging portion 102, immediately above leading extension 104. A second substantially trapezoidal stake 110 is removably attached to edging portion 102 immediately above, and in opposite orientation, to first stake 108. In a preferred embodiment, second stake 110 is also removably attached to first stake 108. In this location and orientation, first stake 108 and second stake 110 form a rectangular portion having a height equal to approximately one-half the height of edging portion 102. This can be seen clearly in FIG. 2, in which first stake 108 and second stake 110 have been detached and removed from edging portion 102, leaving leading extension 104 extending from edging portion 102.

Referring back to FIG. 1 for description of another preferred embodiment, a third substantially trapezoidal stake 112 is removably attached to edging portion 102, immediately below trailing extension 106. A fourth substantially trapezoidal stake 114 is removably attached to edging portion 102 immediately below, and in opposite orientation, to third stake 112. In a preferred embodiment, fourth stake 114 is also removably attached to third stake 112. In this location and orientation, third stake 112 and fourth stake 114 form a rectangular portion having a height equal to approximately one-half the height of edging portion 102.

In a more preferred embodiment, the formation of a rectangular segment by combination of adjacent and opposite orientation of first stake 108 and second stake 110 is achieved by using stakes 108, 110, 112, and 114 in the general form of trapezoids comprising two substantially right angles. This can best be seen by reference to FIG. 6.

Figure 4:
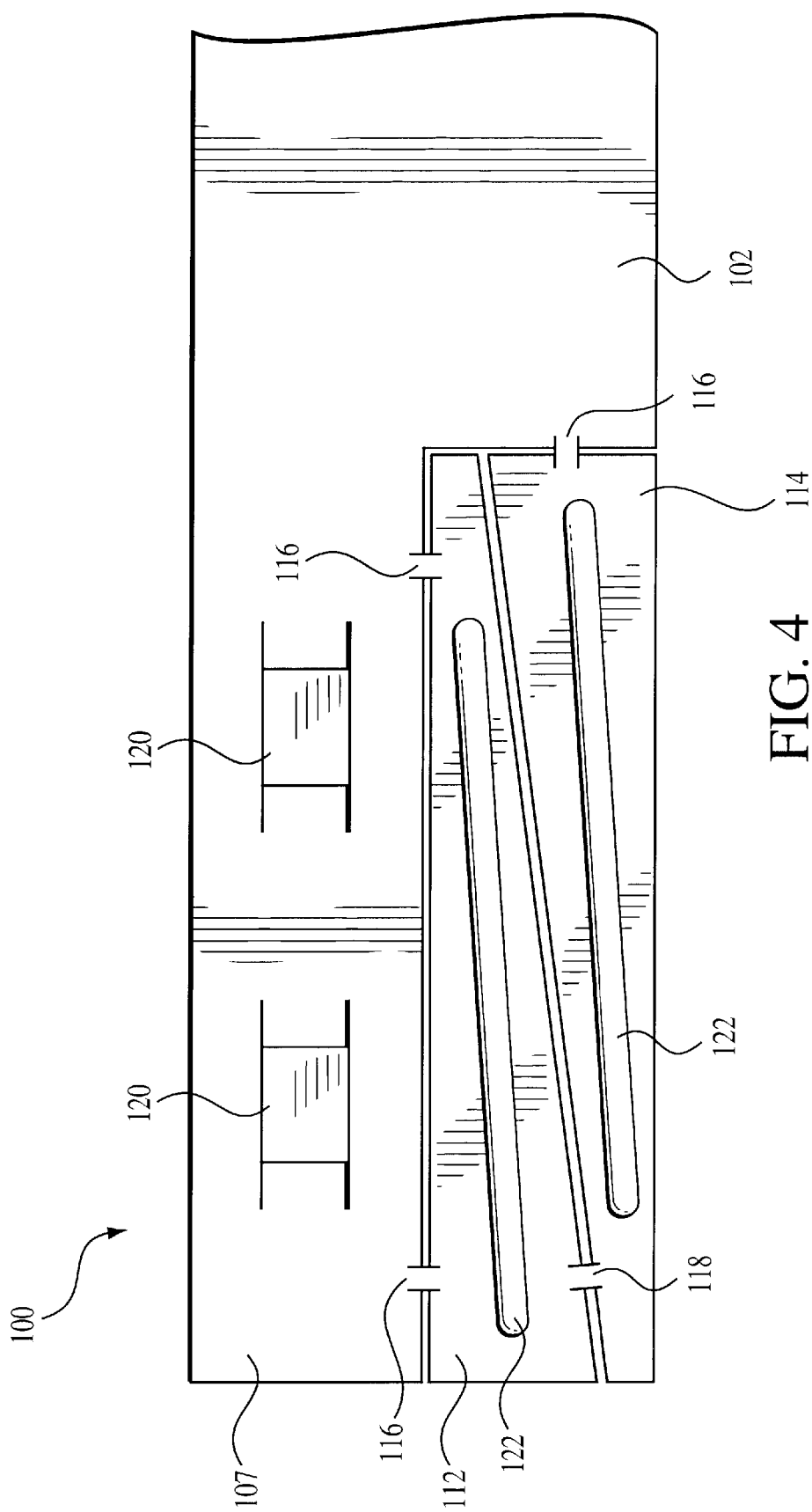
FIG. 4 is a front view close-up of a preferred embodiment of the present invention showing the second end of the edging having the stakes removably attached. In this view, breakable tabs are shown as connecting the oppositely oriented stakes to the edging portion, and to each other, below the trailing extension.

FIG. 3 is a front view close-up of a preferred embodiment of the present invention showing one end of the edging system 100 having stakes 108 and 110 removably attached. Similarly, FIG. 4 is a front view close-up showing the opposite end of edging system 100 having stakes 112 and 114 removably attached. In a preferred embodiment shown in FIG. 3 and FIG. 4, at least one breakable primary tab 116 removably attaches edging portion 102 to each of stakes 108, and 110, 112, and 114. In a more preferred embodiment, at least one breakable secondary tab 118 removably attaches each of first stake 108 to second stake 110, and third stake 112 to fourth stake 114. In still a more preferred embodiment, primary tabs 116, and secondary tabs 118 are in the approximate range of about 0.13 inches and 0.25 inches wide. In a still more preferred embodiment, primary tabs 116 and secondary tabs 118 are approximately 0.19 inches wide.

Figure 5:
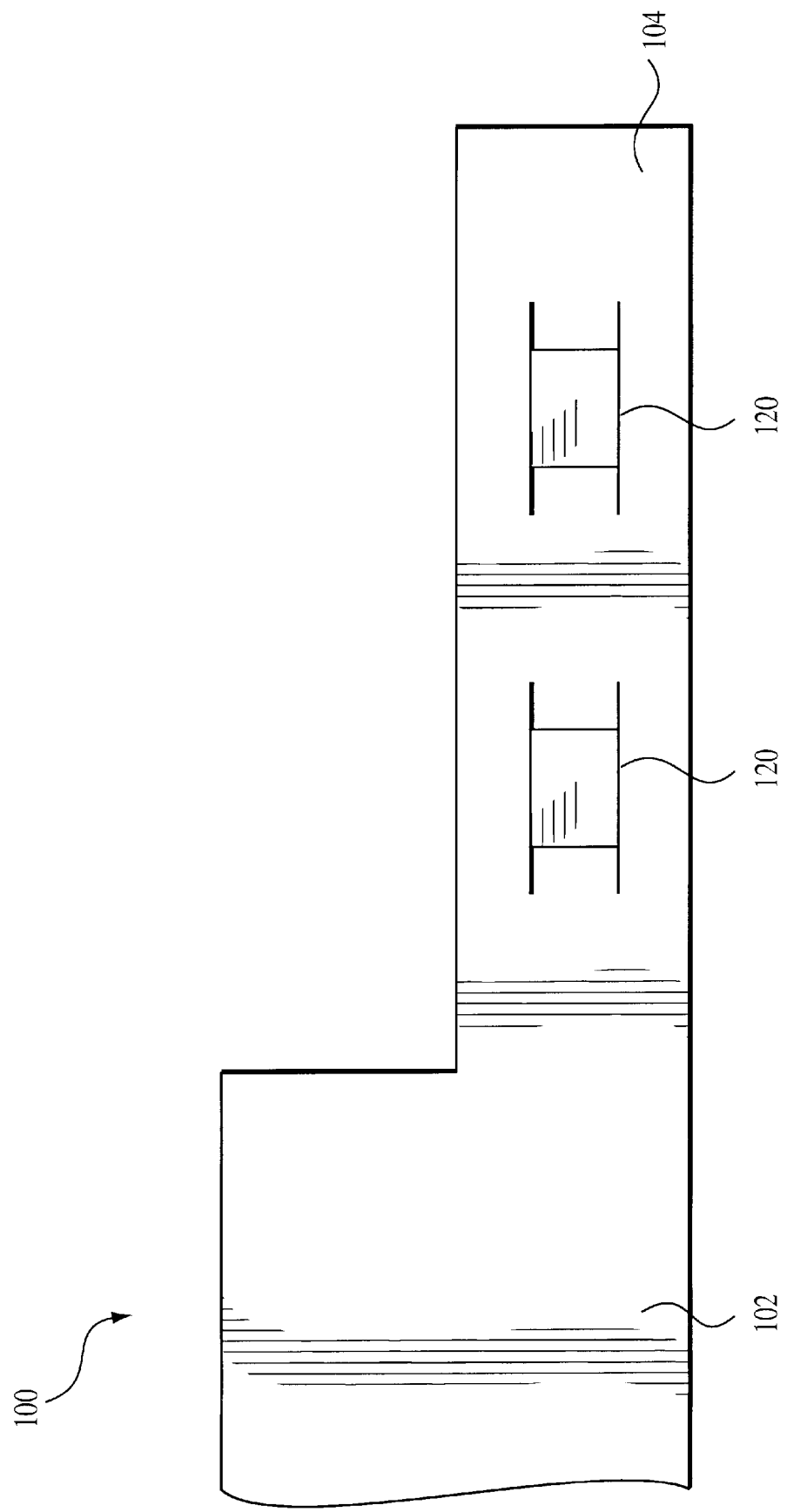
FIG. 5 is a front view close-up of a preferred embodiment of the present invention shown in FIG. 3 showing the first end of the edging with the stakes removed. The leading extension remains available for aligned attachment to the trailing edge of another section of edging or for attachment to the soil.

FIG. 5 is a front view close-up of a preferred embodiment of the present invention shown in FIG. 3 showing leading extension 104 of the edging system 100 with stakes 108 and 110 removed. Referring to this view, a preferred embodiment includes stake pockets 120 attached to edging portion 102 for receiving any of stakes 108, 110, 112, or 114.

Figure 6:
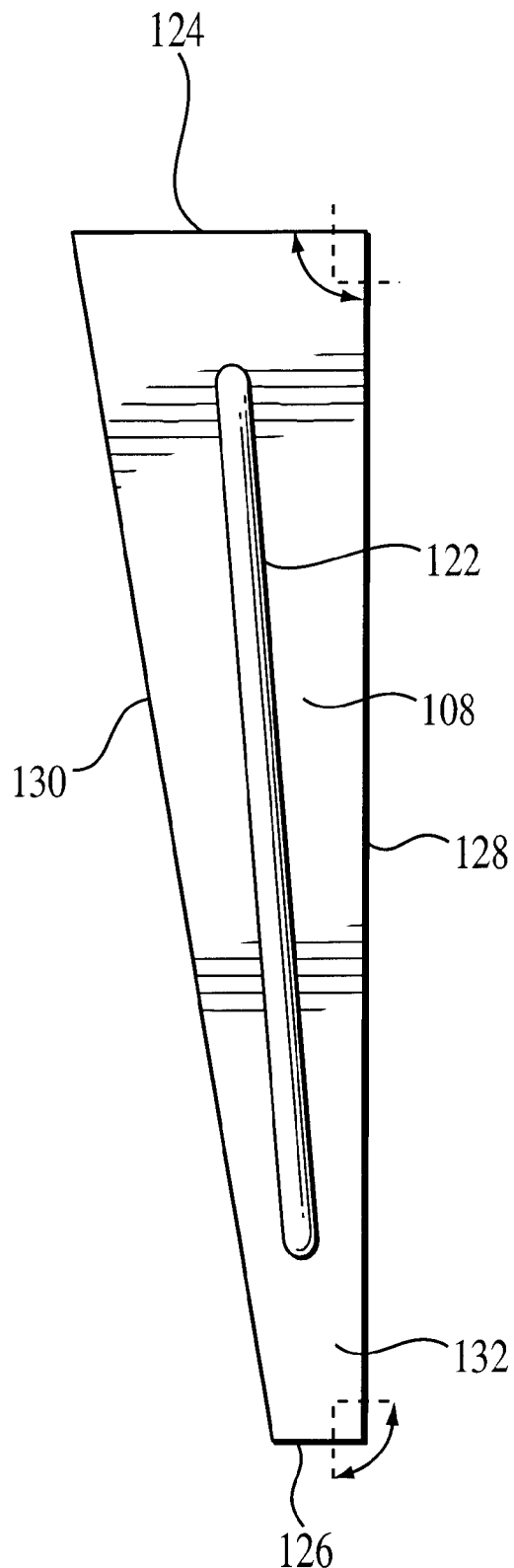
FIG. 6 is a front view of a stake showing a preferred embodiment in which the top of the stake has a right angle relation to one side. The stake also has a chamfered edge at the bottom, and a stiffening rib along the center.

FIG. 6 is a front view of a stake 108. While this view is of a preferred embodiment of stake 108, in a more preferred embodiment, stakes 108, 110, 112, and 114 are geometrically and dimensionally substantially equivalent, so that FIG. 6 and the geometrical and dimensional descriptions in this and all paragraphs apply to, and are representative of, all stakes 108, 110, 112, and 114. In a preferred embodiment, stake 108 has a stake top 124 and an opposite stake bottom 126. In the most preferred embodiment, stake 108 has a first side 128 which forms a substantially right angle with stake top 124. First side 128 also forms a substantially right angle with stake bottom 126. In the same most preferred embodiment, stake 108 has a second side 130 that forms an acute angle with stake top 124. Second side 130 also forms an obtuse angle with stake bottom 126. Thus, in the most preferred embodiment, stake 108 substantially forms a trapezoid having two right angles. In this embodiment, stake bottom 126 is formed to break the sharp point of the vertex formed between first side 128 and second side 130. In an alternative embodiment, there is no stake bottom 126 and stake 108 is substantially a right triangle with first side 128 and second side 130 forming the vertex.

In another preferred embodiment stakes 108, 110, 112, and 114, are approximately 8 inches in length, so as to be interchangeable with the many components of edging systems currently on the market and readily available.

In the most preferred embodiment, a stiffening rib 122 extends longitudinally along each of stakes 108, 110, 112, and 114, as can be seen in FIG. 6. In a more preferred embodiment, the height of each longitudinal stiffening rib 122 is at least equal to approximately the thickness of stakes 108, 110, 112, or 114. In a still more preferred embodiment, the height of longitudinal stiffening rib 122 is approximately 150% of the thickness of the material of stakes 108, 110, 112, or 114. In another preferred embodiment, a non-ribbed stake tip 132 is present on stake 108, between stake bottom 126 and stiffening rib 122, to facilitate entry into stake pocket 120. In a still more preferred embodiment, the sum of the material thickness of stake 108 (or of any stake 110, 112, or 114) plus the height of stiffening rib 122, is equal to or greater than the width of the opening of stake pocket 120.

Figure 7:
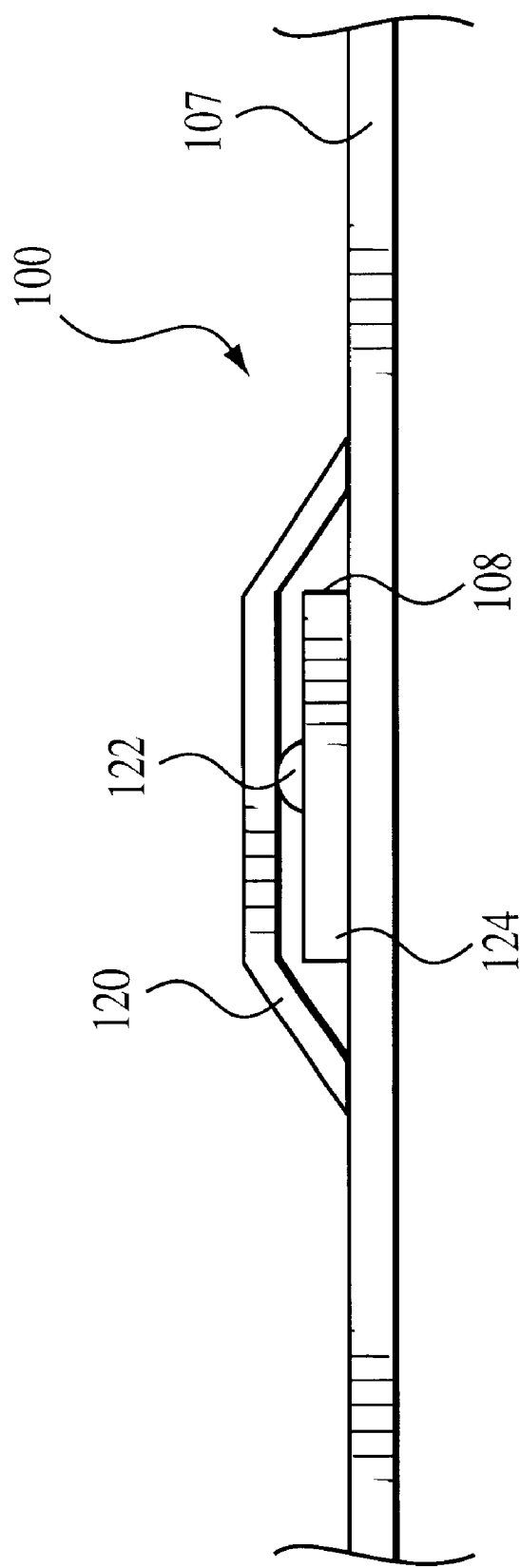
FIG. 7 is a top view of a stake inserted into a pocket. In this view of a preferred embodiment, it can be seen that the width of the stake including the stiffening rib is slightly wider than the pocket width, so as to form a secure interference fit of the stake within the pocket.

FIG. 7 is a top view of stake 108 inserted into stake pocket 120. In this view of a preferred embodiment, it can be seen that the thickness of stake 108, including the height of stiffening rib 122, can be slightly wider than the opening in stake pocket 120, so as to form a secure interference fit of stake 108 within pocket 120.

Figure 8:
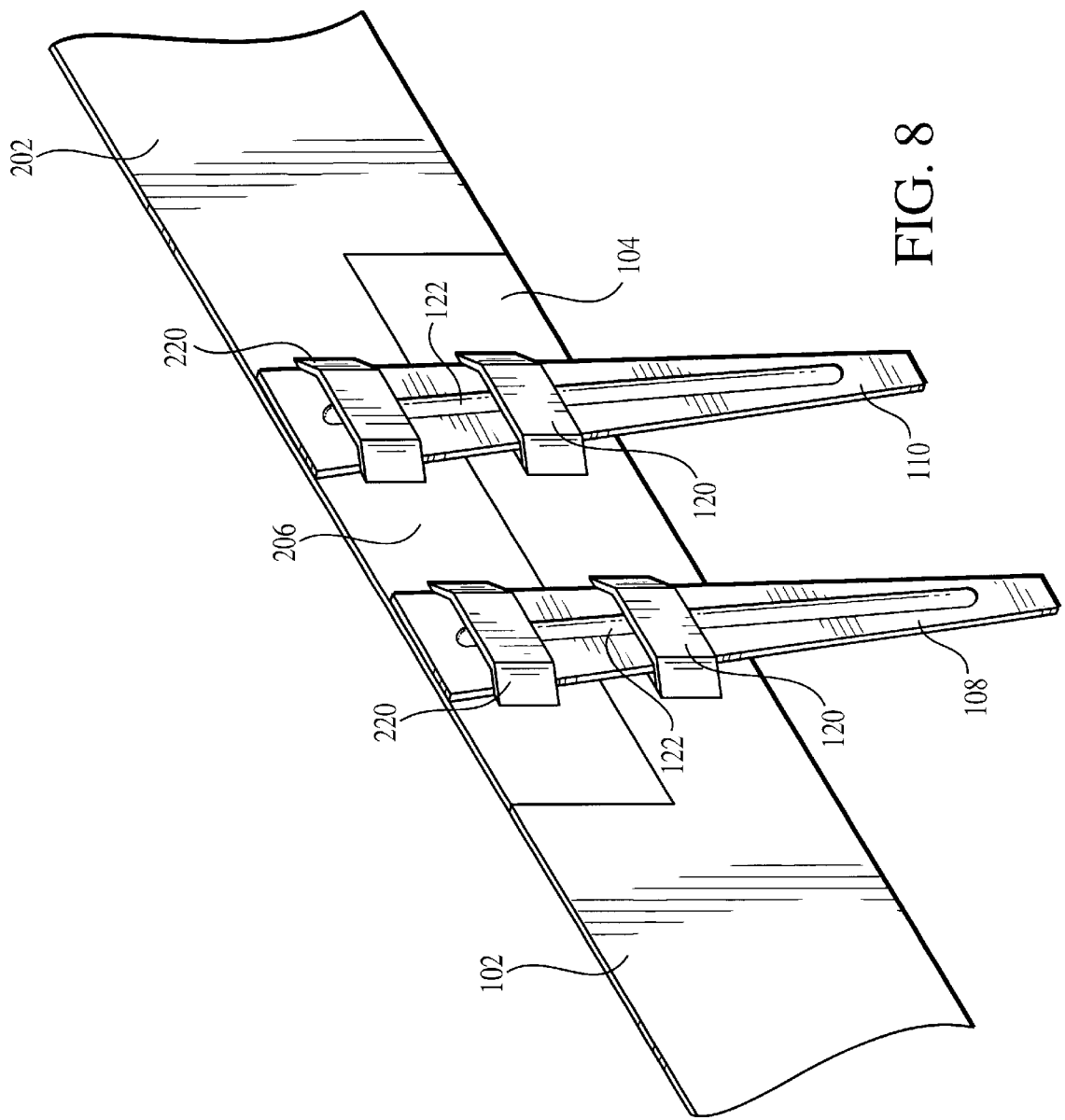
FIG. 8 is a front view close-up of a preferred embodiment of the present invention showing the complimentary match of leading extensions and trailing extensions of multiple sections of edging aligned in series connection to form a continuous landscaping barrier of variable length. Stakes are in place to hold adjacent sections of edging in continuous alignment and attached to the soil.

FIG. 8 is a front view close-up of a preferred embodiment of the present invention showing the complimentary match of leading extension 104 of a first section of edging system 100 and a trailing extension 206 of a second section of edging portion 202 aligned in series connection to form a continuous landscaping barrier. Stake 108 and stake 110 are inserted into stake pockets 120 and stake pockets 220 to hold adjacent sections of edging system 100 in continuous alignment and attached to the soil.

In a still more preferred embodiment, edging portion 102 is made by press cutting/forming stakes 108, 110, 112, and 114, stake pockets 120, primary tabs 116 and secondary tabs 118 from continuously fed metal strip. In this embodiment, primary tabs 116 and secondary tabs 118 are formed by providing a relief of the desired dimension between the punch tooling and dye tooling of the press. In a still more preferred embodiment, edging system 100 is made from metal stock of between approximately 12 gage and 16 gage thickness. In the most preferred embodiment, edging system 100 is made from metal stock of approximately 14 gage thickness.

Operation of the Invention

In a preferred embodiment of the present invention, an edging system 100 is disclosed, being substantially flat and rectangular, and made of a durable and flexible material. In a preferred embodiment, edging system 100 is made of a bendable material such as metal, which is painted or galvanized. Edging system 100 is comprised of an edging portion 102 having at one end a generally rectangular leading extension 104 and located diagonally opposite at the other end, a matching trailing extension 106. Adjacent and removably attached to leading extension 104, are two generally trapezoidal stakes 108 and 110, in opposite orientation. Stakes 108 and 110 are of substantially right-trapezoidal geometry so as to form together a rectangular section of substantially similar dimensions to that of leading extension 104. Similarly, adjacent and removably attached to trailing extension 106, are two generally trapezoidal stakes 112 and 114, in opposite orientation. Stakes 112 and 114 are of substantially right trapezoidal geometry so as to form together a rectangular section of substantially similar dimensions to that of trailing extension 106. Thus constructed, stakes 108, 110, 112, and 114, and edging portion 102 form a unitary and substantially fully rectangular edging system 100. The single piece construction and rectangularity of edging system 100 permits improved efficiencies in manufacturing, painting, coating, handling, packaging, shipping, displaying, inventory, and delivering in retail transactions.

In a preferred embodiment, stakes 108, 110, 112, and 114, are attached to edging portion 102 by primary tabs 116. In a more preferred embodiment, stakes 108 and 110, and stakes 112 and 114 are attached to each other by a secondary tab 118. Primary tabs 116 and secondary tabs 118 are bendable and easily broken when a bending and/or torsional force is applied. This can be most easily accomplished by clamping onto any individual stake with a pair of pliers and bending and/or twisting the stake until primary tabs 116 and secondary tabs 118 are broken, releasing the stake from edging portion 102. The landscaper will typically first remove either stake 110 or stake 114, since they are the outermost stakes attached to edging portion 102. In removing outermost stakes 110 and 114, the landscaper will break primary tabs 116 and secondary tabs 118. When the landscaper removes stakes 110 and 114, he will have exposed stakes 108 and 112 for easy gripping with pliers. The landscaper removes stakes 108 and 110 from edging portion 102 by breaking the remaining primary tabs 116. When the landscaper removes innermost stake 108, he will have exposed leading extension 104 on one end of edging portion 102. When the landscaper similarly removes innermost stake 112 from the diagonally opposite end of edging portion 102, he will have exposed trailing extension 106. The landscaper then places edging portion 102 in the desired position in the soil. Any of stakes 108, 110, 112, and 114 can then be inserted into any of stake pockets 120, which are attached to edging portion 102. The landscaper then hammers stake top 124 of selected stake (108, 110, 112, or 114) into the soil to secure edging portion 102 into place.

In a preferred embodiment, each of stakes 108, 110, 112, and 114 has a longitudinal stiffening rib 122. Longitudinal stiffening ribs 122 allow the manufacturer to manufacture stakes 108, 110, 112, and 114 out of the same stock that the edging portion 102 is made from. This results in the increased resistance to buckling that stiffening ribs 122 add to stakes 108, 110, 112, and 114, as is necessary to withstand the hammering applied by the landscaper to drive the stakes into the soil. The central location and narrow structure of stiffening ribs 122 on stake (108, 110, 112, and 114) allow stake (108, 110, 112, and 114) to have an overall height that is equal to or greater than the width of the opening of pocket 120. The low profile of stake tip 132 facilitates easy insertion of stake (108, 110, 112, or 114) into the opening of pocket 120.

Figure 9:
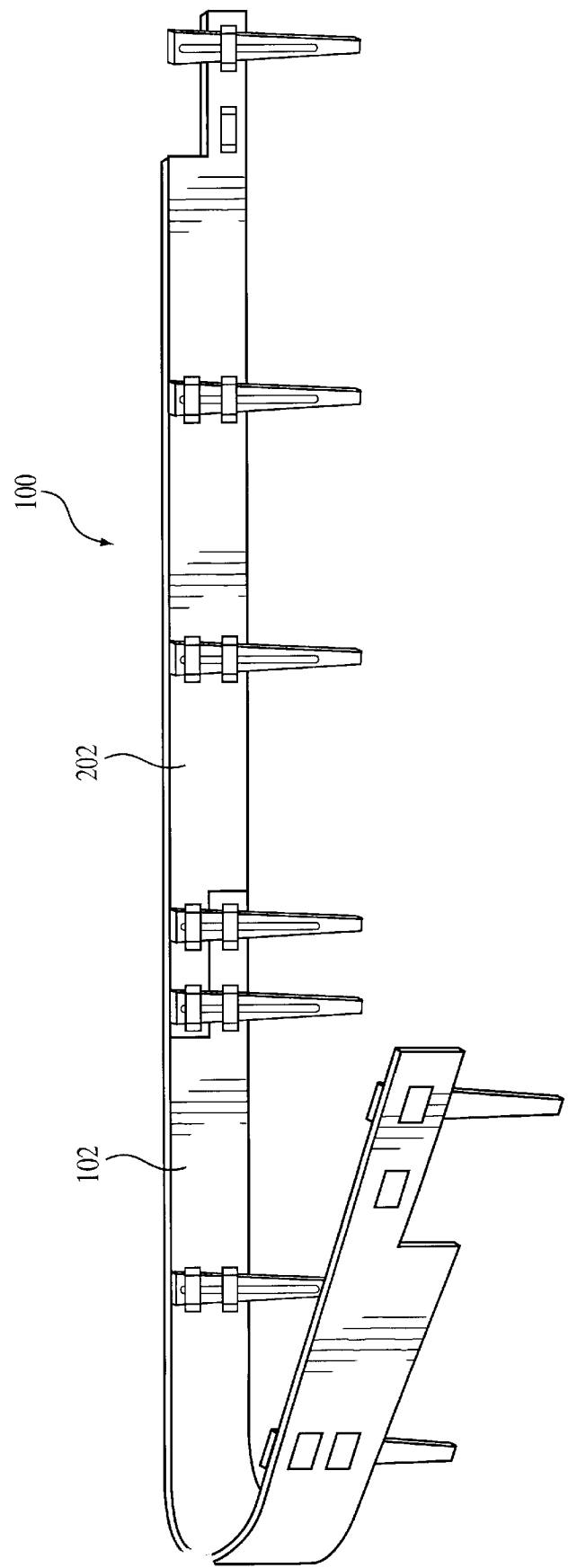
FIG. 9 is an isometric view showing the complementary match of two sections of edging aligned in series connection.

FIG. 8 and FIG. 9 show the complementary match of leading extension 104 and trailing extension 106 when multiple sections of edging system 100 are aligned in series connection to form a continuous landscape barrier of variable length. Thus the landscaper can connect multiple sections of edging system 100 in series, end-to-end. In this configuration, leading extension 104 of a first edging portion 102 will complementarily match a trailing extension 206 of a second edging portion 202. Stake pockets 120 are located on leading extension 104 for alignment with stake pockets 220 on trailing extension 206 so that any of stakes 108, 110, 112, or 114 may be used to interlock leading extension 104 of edging portion 102 with trailing extension 206 of second edging portion 202 to form a continuous length of interlocking sections of a landscape barrier.

While this invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims. By way of example, the references to leading and trailing extensions are interchangeable, since the edging system is equally functional regardless of which direction it faces, and these terms are included only to aid in the description of the continuous connectivity of edging portions to form a landscape barrier of any desired length. For all purposes of this patent, leading extensions and trailing extensions may be alternatively referred to as "extensions" or "end extensions." For all purposes of this patent, stakes are considered substantially the same and interchangeable. Also, although stakes are described in a preferred embodiment as trapezoidal, the smallest side of the trapezoid may be eliminated in an alternative embodiment to form a triangular stake, and still remain entirely within the spirit and description of the present invention.

PART LIST

| | |
|---|---|
| Edging system | 100 |
| Edging portion | 102 |
| Leading extension | 104 |
| Trailing extension | 106 |
| First stake | 108 |
| Second stake | 110 |
| Third stake | 112 |
| Fourth stake | 114 |
| Primary tabs | 116 |
| Secondary tabs | 118 |
| Stake pockets | 120 |
| Stiffening rib | 122 |
| Stake Top | 124 |
| Stake bottom | 126 |
| Stake First Side | 128 |
| Stake Second Side | 130 |
| Non-ribbed stake portion | 132 |
| Second edging portion | 202 |
| Second edging trailing edge | 206 |
| Second edging stake pockets | 220 |

We claim:

1. A landscape edging system comprising:

an edging portion;

a plurality of stake pockets located on the edging portion;

a plurality of stakes removably attached to the edging portion;

at least one stake being substantially trapezoidal; and, whereas the stakes, when detached from the edging portion, are engagably insertable into the stake pockets.

2. A landscape edging system In accordance with claim 1, further comprising:

at least one stake's trapezoidal perimeter containing a substantially right-angle.

3. A landscape edging system in accordance with claim 1, further comprising:

at least one stake's trapezoidal perimeter containing two substantially right-angles.

4. A landscape edging system in accordance with claim 1, further comprising:

at least one stake being substantially triangular.

5. A landscape edging system in accordance with claim 4, further comprising:

at least one stake's triangular perimeter containing a substantially right-angle.

6. A landscape edging system in accordance with claim 1, further comprising:

all stakes are substantially dimensionally equivalent.

7. A landscape edging system in accordance with claim 1, further comprising:

at least two stakes removably attached to the edging portion in opposite orientation and adjacent relation to each other.

8. A landscape edging system in accordance with claim 1, further comprising:

a substantially rectangular leading extension on one end of the edging portion.

9. A landscape edging system in accordance with claim 8, further comprising:

a substantially rectangular trailing extension, located diagonally opposite to the leading extension.

10. A landscape edging system in accordance with claim 8, further comprising:

at least one stake having a length approximately equal to the length of the leading extension.

11. A landscape edging system in accordance with claim 8, further comprising:

two stakes removably attached to the edging portion in opposite orientation and adjacent to the leading end extension of the edging portion.

12. A landscape edging system in accordance with claim 1, further comprising:

a plurality of breakable primary tabs, each primary tab attaching a stake to the edging portion.

13. A landscape edging system in accordance with claim 12, further comprising:

the width of the primary tabs being in the approximate range of about 0.13 inches to about 0.25 inches.

14. A landscape edging system in accordance with claim 12, further comprising:

the width of the primary tabs being approximately 0.19 inches.

15. A landscape edging system in accordance with claim 1, further comprising:

at least one breakable secondary tab attaching a stake to another stake.

16. A landscape edging system in accordance with claim 15, further comprising:

the width of the secondary tabs being in the approximate range of about 0.13 inches to about 0.25 inches.

17. A landscape edging system in accordance with claim 15, further comprising:

the width of the secondary tabs being approximately 0.19 inches.

18. A landscape edging system comprising:

an edging portion;

a plurality of stake pockets located on the edging portion;

a plurality of stakes removably attached to the edging portion;

at least one stiffening rib located on at least one stake;

at least one stake being substantially trapezoidal; and, whereas the stakes, when detached from the edging portion, are engagably insertable into the stake pockets.

19. A landscape edging system in accordance with claim 18, further comprising:

at least one stiffening rib being located generally central and lengthwise on a stake.

20. A landscape edging system in accordance with claim 18, further comprising:

the height of the stiffening rib being at least the same as the thickness of the stake.

21. A landscape edging system in accordance with claim 18, further comprising:

the height of the stiffening rib being approximately 1.5 (one and one-half) times the thickness of the stake.

22. A landscape edging system in accordance with claim 18, further comprising:

the sum of the material thickness of the stake plus the height of the stiffening rib being at least as large as the stake pocket opening.

23. A method of manufacturing a landscape edging system in accordance with claim 1, comprising:

press cutting and forming an edging portion with stakes removably attached to the edging portion from a continuously fed metal strip.

24. The method of manufacturing a landscape edging system in accordance with claim 23, further comprising the step of:

coating the edging system by painting or galvanizing.

25. The method of manufacturing a landscape edging system in accordance with claim 23, further comprising:

whereas the metal strip is between approximately 12 gage and 16 gage thickness.

26. The method of manufacturing a landscape edging system in accordance with claim 23, further comprising:

whereas the metal strip is approximately 14 gage thickness.

27. The method of manufacturing a landscape edging system in accordance with claim 23, further comprising:

whereas tabs between the stakes and the edging portion are formed by providing a relief of the desired tab width between the punch and dye of the press.

28. The method of manufacturing a landscape edging system in accordance with claim 23, further comprising:

whereas the relief of the desired tab width between the punch and dye of the press is in the approximate range of about 0.13 inches to about 0.25 inches.

29. The method of manufacturing a landscape edging system in accordance with claim 23, further comprising:

whereas the relief of the desired tab width between the punch and dye of the press is approximately 0.19 inches.

* * * * *